US009535715B2

(12) United States Patent
Pfeifer, Jr. et al.

(10) Patent No.: US 9,535,715 B2
(45) Date of Patent: Jan. 3, 2017

(54) BOOTING FROM A TRUSTED NETWORK IMAGE

(71) Applicant: Microsoft Corporation, Redmond, WA (US)

(72) Inventors: William Daniel Pfeifer, Jr., Redmond, WA (US); Douglas Grayson Hill, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 13/714,454

(22) Filed: Dec. 14, 2012

(65) Prior Publication Data

US 2014/0173263 A1 Jun. 19, 2014

(51) Int. Cl.
*G06F 9/44* (2006.01)
*G06F 21/57* (2013.01)
(Continued)

(52) U.S. Cl.
CPC .......... *G06F 9/4416* (2013.01); *G06F 21/335* (2013.01); *G06F 21/575* (2013.01);
(Continued)

(58) Field of Classification Search
CPC .... G06F 9/4401; G06F 9/4416; G06F 9/4408; G06F 21/575; G06F 1/24; H04L 41/0806
(Continued)

(56) References Cited

U.S. PATENT DOCUMENTS 5,974,547 A * 10/1999 Klimenko ............. G06F 9/4416 709/217
6,035,423 A *  3/2000 Hodges et al. ............. 714/38.1
(Continued)

OTHER PUBLICATIONS

Parks, Matthew., "Microsoft releases a Standalone Offline Malware Sweeper", Retrieved at <<http://str8upgeeksta.blogspot.in/2011/06/microsoft-releases-standalone-offline.html#!/2011/06/microsoft-releases-standalone-offline.html, Jun. 17, 2011, p. 1.
(Continued)

*Primary Examiner* — Joseph E Avellino
*Assistant Examiner* — Patrick Ngankam
(74) *Attorney, Agent, or Firm* — Timothy Churna; Kate Drakos; Micky Minhas (57) ABSTRACT

The present invention extends to methods, systems, and computer program products for booting from a trusted network image. The image can be executed from a trusted source on a Wide Area Network ("WAN") to perform a maintenance operation, such as, for example, malware scanning, operating system repair, factory reset, etc. at the computer system. Trust can be established using a Certificate Authority or an out of band communication channel (e.g., voice communication, text message, electronic mail, etc.) to retrieve a one-time pad ("OTP"). Using the OTP the computer can validate that it is connected to the trusted source. The trusted source can chain to additional images hosted on a third-party server. The additional images can provide a user with options for various different maintenance operations or various different implementations of the same maintenance operation. For example, the trusted source can link to multiple different malware scanners.

20 Claims, 3 Drawing Sheets

(51) Int. Cl.
   G06F 21/33   (2013.01)
   H04L 29/08   (2006.01)
   H04L 29/06   (2006.01)
   H04L 12/24   (2006.01)

(52) U.S. Cl.
   CPC ........ H04L 63/0838 (2013.01); H04L 63/126 (2013.01); H04L 67/34 (2013.01); *G06F 2221/2115* (2013.01); *H04L 41/0806* (2013.01); *H04L 63/18* (2013.01)

(58) Field of Classification Search
   USPC .......................... 709/217–222; 713/1–2, 100
   See application file for complete search history.

(56) References Cited

U.S. PATENT DOCUMENTS

| | | | | |
|---|---|---|---|---|
| 6,058,474 | A * | 5/2000 | Baltz et al. ........................ | 713/1 |
| 8,011,010 | B2 | 8/2011 | Michael et al. | |
| 2002/0198972 | A1* | 12/2002 | Babbitt et al. ................ | 709/222 |
| 2005/0038985 | A1* | 2/2005 | Taylor .................. | G06F 9/4408 |
| | | | | 713/2 |
| 2005/0180326 | A1* | 8/2005 | Goldflam ................ | H04L 12/12 |
| | | | | 370/231 |
| 2005/0193393 | A1* | 9/2005 | Fausak ......................... | 719/317 |
| 2007/0294566 | A1* | 12/2007 | Solyanik .............. | G06F 9/4416 |
| | | | | 714/6.11 |
| 2008/0016178 | A1* | 1/2008 | Portugali ............ | G06F 11/1464 |
| | | | | 709/217 |
| 2008/0196104 | A1 | 8/2008 | Tuvell et al. | |
| 2009/0205045 | A1* | 8/2009 | Horvath ................ | G06F 21/575 |
| | | | | 726/23 |
| 2009/0307776 | A1 | 12/2009 | Curnyn | |
| 2011/0113231 | A1* | 5/2011 | Kaminsky ........................ | 713/2 |
| 2011/0154043 | A1* | 6/2011 | Lim ........................ | G06F 21/73 |
| | | | | 713/172 |
| 2012/0144461 | A1* | 6/2012 | Rathbun ............... | H04L 9/3213 |
| | | | | 726/5 |
| 2012/0151582 | A1 | 6/2012 | Reasor et al. | |
| 2013/0212653 | A1* | 8/2013 | Hoghaug ........................ | 726/5 |
| 2013/0290694 | A1* | 10/2013 | Civilini ............... | H04L 41/0806 |
| | | | | 713/2 |
| 2013/0311918 | A1* | 11/2013 | McCoy .................... | G06F 8/38 |
| | | | | 715/765 |

OTHER PUBLICATIONS

Omeally, Yvette., "Launching a Windows Defender Offline Scan with Configuration Manager 2012 OSD", Retrieved at <<http://blogs.technet.com/b/configmgrteam/archive/2012/04/12/launching-a-windows-defender-offline-scan-with-configuration-manager-2012-osd.aspx>>, Apr. 12, 2012, pp. 5.

Parks, Matthew., "Microsoft releases a Standalone Offline Malware Sweeper", Retrieved at <<http://str8upgeeksta.blogspot.in/2011/06/microsoft-releases-standalone-offline.html#!/2011/06/microsoft-releases-standalone-offline.html>>, Jun. 17, 2011, p. 1.

"McAfee ePO Deep Command", Retrieved at <<http://www.mcafee.com/us/resources/data-sheets/ds-epo-deep-command.pdf>>, Retrieved Date Sep. 11, 2012, pp. 2.

Omeally, Yvette., "Launching a Windows Defender Offline Scan with Configuration Manager 2012 OSD", Retrieved at <<http://blogs.technet.com/b/configmgrteam/archive/2012/04/12/Iaunching-a-windows-defender-offline-scan-with-configuration-manager-2012-osd.aspx, Apr. 12, 2012, pp. 5.

* cited by examiner

BOOTING FROM A TRUSTED NETWORK IMAGE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Malware scanners are used on compromised computer systems to clean a malware infection and return the computer system to a clean state. Malware scanners can be run on computer systems that are infected with malware, such as, viruses, root kits, boot loaders, boot kits, Trojan horses, etc. However, when running a malware scanner on an infected computer system, there is no way to insure that the malware scanner itself has not been compromised by a malware infection.

To insure that a computer system is malware free, a malware scanner used to scan the computer system has to run from a known clean location. One approach is to use a bootable external storage device, such as, for example, a USB key, CD, DVD, HDD, etc., with an offline malware scanner. Booting from the external storage device, instead of the computer operating system, allows the user to successfully clean the computer system.

At least one limitation of the approach is that a user needs a USB key or other external media (e.g., a CD or DVD) as well as a clean computer system to create a bootable offline malware scanner image. The user downloads the bootable offline malware scanner image from a network location to the clean computer system. The user copies the bootable offline malware scanner image to the USB key or burns the bootable offline malware scanner image to the external media. The user then boots the infected computer system from the USB key or external media to run the malware scanner.

BRIEF SUMMARY

The present invention extends to methods, systems, and computer program products for booting from a trusted network image. Embodiments of the invention include booting from a trusted network image to perform a maintenance operation at the computer system. A boot process is initiated at a computer system. A boot order menu is presented at a display device in response to user input received during the boot process. The boot order menu includes a network boot option to perform the maintenance operation. A selection of the network boot option is received.

In response to receiving the selection of the network boot option, the computer system (e.g., a client) uses network communication to connect to another computer system (e.g., a server) on a Wide Area Network (WAN). The computer system determines that the other computer system is a trusted computer system. The computer system receives a path to each of one or more network bootstrap programs stored at the other computer system. Each of the one or more bootstrap programs is for performing a maintenance operation.

A selection of a network bootstrap program from among the one or more network bootstrap programs is received. In response to receiving the selection of the network bootstrap program, the corresponding path is used to transfer the network bootstrap program from the other computer system, over the Wide Area Network (WAN), to the computer system. The network bootstrap program is run at the computer system to perform the maintenance operation at the computer system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for booting from a trusted network image. Embodiments of the invention include booting from a trusted network image to perform a maintenance operation at the computer system. A boot process is initiated at a computer system. A boot order menu is presented at a display device in response to user input received during the boot process. The boot order menu includes a network boot option to perform the maintenance operation. A selection of the network boot option is received.

In response to receiving the selection of the network boot option, the computer system (e.g., a client) uses network communication to connect to another computer system (e.g., a server) on a Wide Area Network (WAN). The computer system determines that the other computer system is a trusted computer system. The computer system receives a path to each of one or more network bootstrap programs stored at the other computer system. Each of the one or more bootstrap programs is for performing a maintenance operation.

A selection of a network bootstrap program from among the one or more network bootstrap programs is received. In response to receiving the selection of the network bootstrap program, the corresponding path is used to transfer the network bootstrap program from the other computer system, over the Wide Area Network (WAN), to the computer system. The network bootstrap program is run at the computer system to perform the maintenance operation at the computer system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Embodiments of the invention include booting a computer system from an image hosted at a trusted source on a Wide Area Network ("WAN"), such as, for example, the Internet. The image can be executed to perform a maintenance operation, such as, for example, malware scanning, operating system repair, factory reset, etc. at the computer system. Trust can be established using an out of band communication channel (e.g., voice communication, text message, electronic mail, etc.) to retrieve a one-time pad ("OTP"). Using the OTP the computer can validate that it is connected to a trusted source (and not an attacker's server). The trusted source can chain to additional images hosted on a third-party server. The additional images can provide a user with options for various different maintenance operations or various different implementations of the same maintenance operation. For example, the trusted source can link to multiple different malware scanners.

Figure 1:
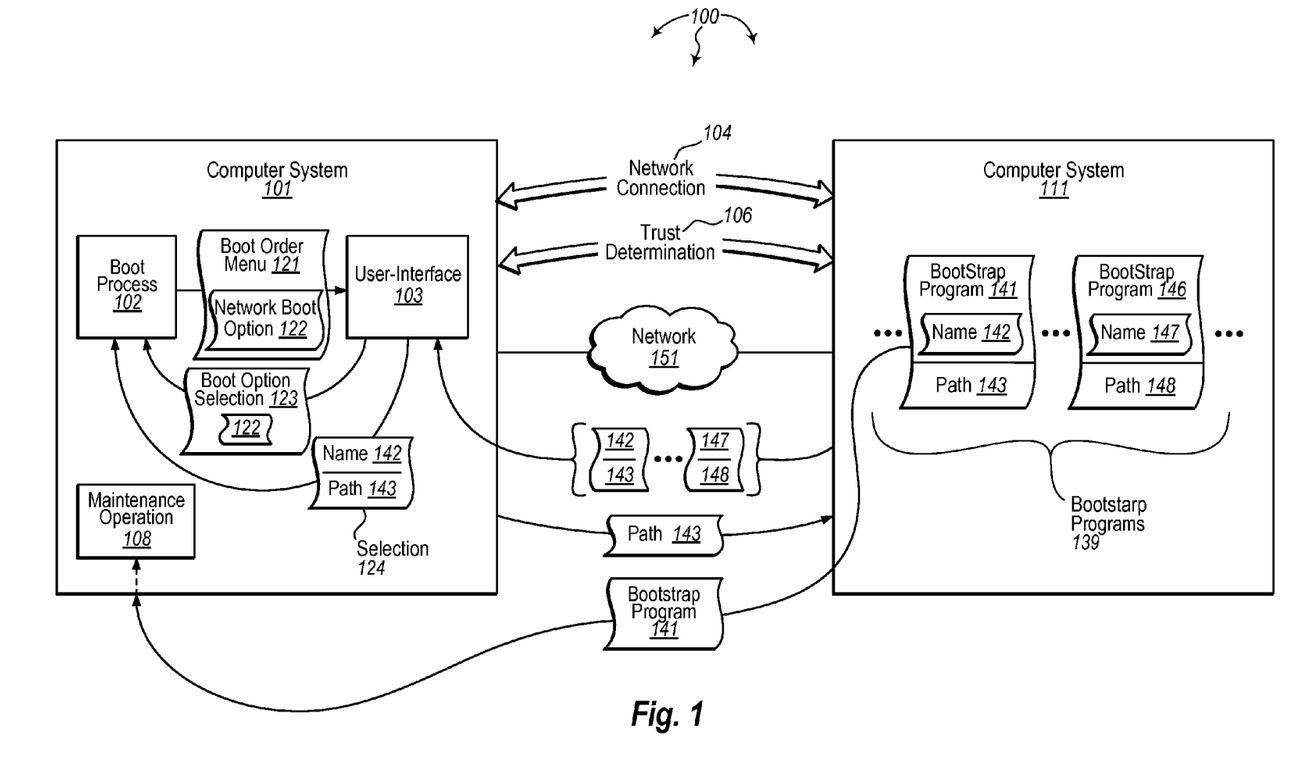
FIG. 1 illustrates an example computer architecture that facilitates booting from a trusted network image.

FIG. 1 illustrates an example computer architecture 100 that facilitates booting from a trusted network image. Referring to FIG. 1, computer architecture 100 includes computer system 101 and computer system 111. Computer system 101 and computer system 111 are connected to one another over network 151. Network 151 can be a Wide Area Network ("WAN"), such as, the Internet. Accordingly, computer system 101, computer system 111, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 151.

As depicted, computer system 101 includes boot process 102 and user-interface 103. During a reboot or cold start of computer system 101, a user can interact with a Basic Input Output System (BIOS). The BIOS of computer system 101 can be accessed by selecting a function key (e.g., F4, F12, etc.) from a connected keyboard. The BIOS can run boot process 102, which presents user-interface 103 (e.g., on an associated display device). Boot process 102 can present boot location options, such as, for example, hard drive, CD-ROM drive, USB drive, network, etc., that the BIOS can access to boot computer system 101. A user of computer system 101 can select one of the boot locations options to boot computer system 101 from the corresponding location.

When "network" is selected from the boot location options, a Preboot Execution Environment (PXE) connects computer system 101 to a (e.g., PXE boot) server on the network, such as, for example, the Internet. The PXE can use a network (e.g., Internet Protocol (IP)) address to access the (e.g., PXE boot) server on the network. In some embodiments, a secure protocol, such as, Secure Socket Layer (SSL), is used to minimize the possibility of tampering with or sniffing of the communication.

After connecting to another computer system (e.g., a server), computer system 101 can establish trust with the other computer system. In some embodiments, computer system 101 includes a Trusted Protection Module (TPM) chip and uses public key signing to establish trust with the other computer system. Using a Certificate Authority, the other computer system can sign a message with its private key, which the TPM can then validate belongs to the server. The public key for the other computer system can be encoded in the firmware of computer system 101. Alternatively, the location of a Certificate Authority (CA) can be stored in the firmware of computer system 101. The stored location can then be used to access the public key for the server from the CA.

In other embodiments, an out of band communication channel, such as, for example, telephone based communication, text messaging, electronic mail, etc., is used to establish trust with a server. For example, a user can call a known phone number (e.g., stored in the firmware) to obtain a one-time pad (OTP). The user can then enter the OTP at computer system 101. The OTP received on the phone can be validated by the PXE as being the same as OTP encryption received from the server. If the OTPs are the same, the server can be trusted. If the OTPs are not the same, the server is not trusted.

Once trust is established, the server can provide a path to a network bootstrap program (NBP) for performing a maintenance operation at computer system 101, such as, scanning computer system 101 for malware, repairing an operating system at computer system 101, returning computer system 101 to factory defaults, etc. Alternatively, the server can provide a list of paths to a number of further trusted third-party NBPs for performing maintenance operations. The choice of which NBP to bootload up from can be up to the user or up to the server depending on contracts.

After a NBP is selected for booting, the PXE can start downloading the NBP into Random Access Memory (RAM) at computer system 101. In some embodiments, Trivial File Transfer Protocol (TFTP) is used to download an NBP. On completion, an NBP can be validated using a checksum (i.e. MD5, CRC, etc.) provided by the server to ensure it was downloaded without corruption/tampering. After a validation check, computer system 101 can start executing the NBP to load software for performing the maintenance operation.

For malware scanning, once loaded, an NBP can scan the contents of computer system 101 detecting and cleaning malware infections. For operating system repair, once loaded, an NBP can scan an operating system at computer system 101 and repair any damaged files. For resetting factory defaults, once loaded, an NBP can change system settings of computer system 101 back to settings at the time computer system 101 was shipped. After an NBP is executed, computer system 101 can be rebooted from a location other than the network location.

Computer system 111 is an example of a network server. Computer system 111 includes bootstrap programs 139 (e.g., NBPs) that can be downloaded to other computer systems. Bootstrap programs 139 can be executed at a computer system to load software for performing a maintenance operation at the computer system.

Figure 2:
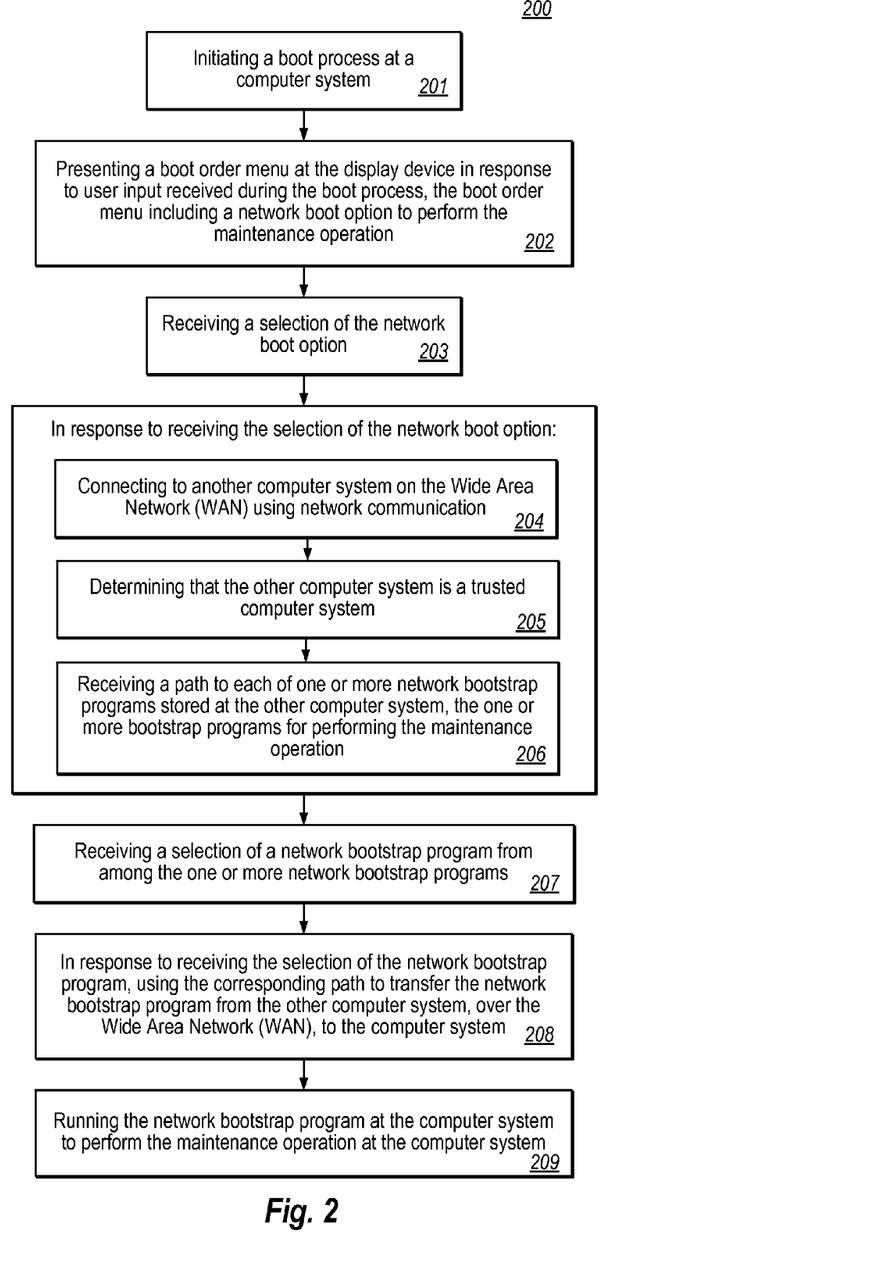
FIG. 2 illustrates a flow chart of an example method for booting from a trusted network image.

FIG. 2 illustrates a flow chart of an example method 200 for booting from a trusted network image. Method 200 will be described with respect to the components and data of computer architecture 100.

Method 200 includes initiating a boot process at a computer system (201). For example, boot process 102 can be initiated at computer system 101. Method 200 includes presenting a boot order menu at the display device in response to user input received during the boot process, the boot order menu including a network boot option to perform the maintenance operation (202). For example, boot order menu 121 can be presented at user-interface 103 (e.g., on a computer monitor) in response to a user selecting a function key on a keyboard. Boot order menu 121 can include network boot option 122 for booting from an image stored at a network location. Network boot option 122 can be a malware scanner boot option, an operating system repair boot option, a factory default settings boot option, etc. Method 200 includes receiving a selection of the network boot option (203). For example, computer system 101 can receive boot option selection 123 selecting network boot option 122.

In response to receiving the selection of the network boot option, method 200 includes connecting to another computer system on the Wide Area Network (WAN) using network communication (204). For example, computer system 101 can use a network (e.g., IP) address for computer system 111 to establish network connection 104. Also in response to receiving the selection of the network boot option, method 200 includes determining that the other computer system is a trusted computer system (205). For example, computer system 101 can make trust determination 106 with respect to computer system 111. Trust determination 106 can use any of a variety of different mechanisms to determine that computer system 111 can be trusted.

Figure 3:
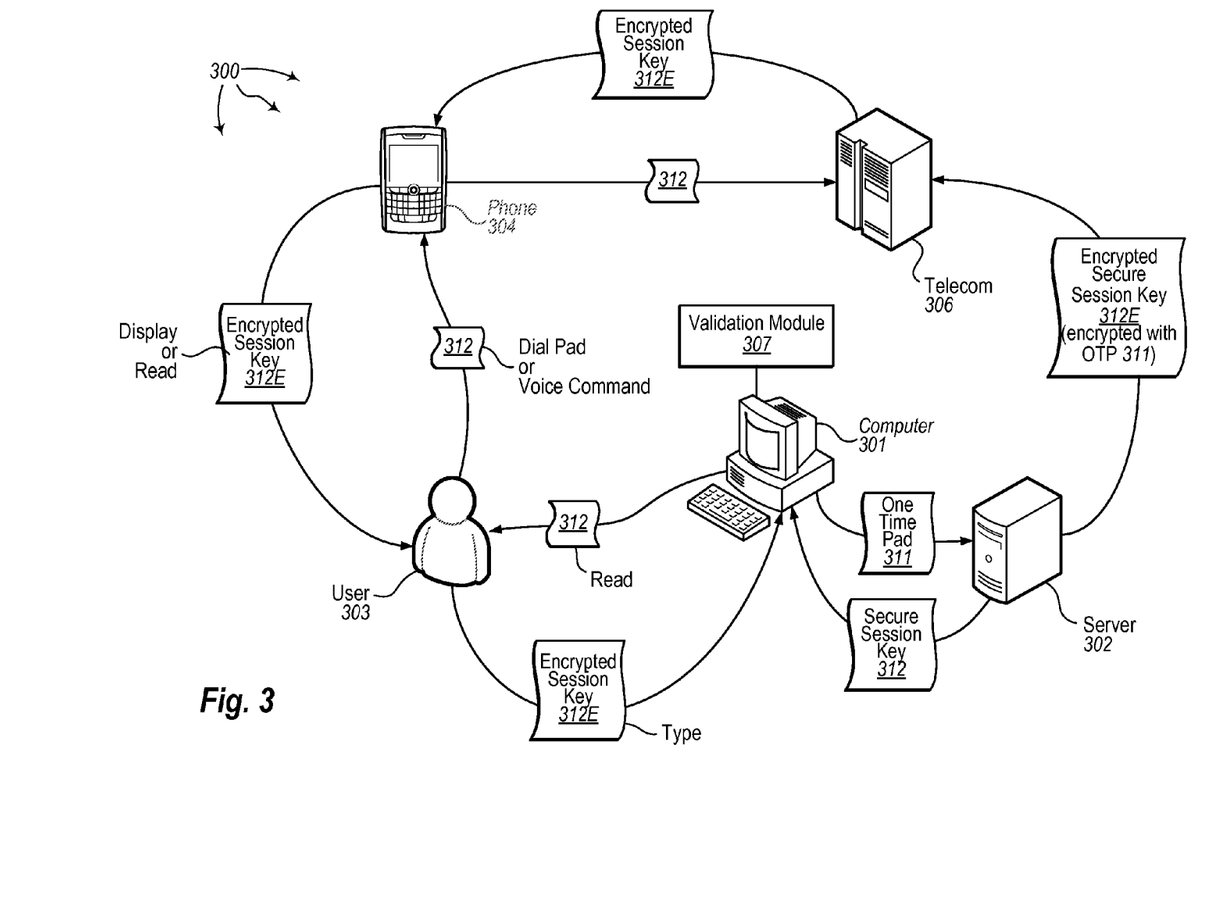
FIG. 3 illustrates an example computer architecture that facilitates determining a server is trusted.

Turning now to FIG. 3, FIG. 3 illustrates an example computer architecture 300 that facilitates determining a server is trusted. As depicted, computer 301 can send one-time pad 311 to server 302. In response, server 302 returns secure session key 312 to computer 301. Also in response, server 302 encrypts secure session key 321 with one-time pad 311 resulting in encrypted secure session key 312E. Server 302 sends encrypted secure session key 312E to telecom 306.

Computer 301 can present secure session key 312 on a display. User 303 can read secure session key 312 from the display. User 303 uses phone 304 to call a telephone number for telecom 306. User 303 can enter secure session key 312, using a dialpad or voice commands, into phone 304. Phone 304 forwards secure session key 312 to telecom 306 when it does a lookup for that session.

In response to receiving secure session key 321, telecom 306 returns encrypted secure session key 312E to phone 304. Phone 304 displays or reads encrypted secure session key 312E to user 303. User 303 then types encrypted secure session key 312E into computer 301. Validation module 307 encrypts secure session 312 with one-time pad 311 resulting in encrypted secure session key 312E. Validation module 307 then validates that encrypted secure session key 312E received from phone 304 matches locally encrypted secure session key 312E. If there is a match, computer 301 can view server 302 as a trusted (e.g., Internet) server. If there is not a match, computer 301 does not view server 302 as a trusted server.

Returning to FIG. 2, also in response to receiving the selection of the network boot option, method 200 includes receiving a path to each of one or more network bootstrap programs stored at the other computer system, the one or more bootstrap programs for performing the maintenance operation (206). For example, computer system 111 can send names and paths for each of boot strap programs 139 to computer system 101. For example, computer system 111 can send name 142 and path 143 for bootstrap program 141. Similarly, computer system 111 can send name 147 and path 148 for bootstrap program 146. Computer system 101 can receive names and paths for each of boot strap programs 139 from computer system 111. For example, computer system 101 can receive name 142 and path 143 for bootstrap program 141. Similarly, computer system 101 can receive name 147 and path 148 for bootstrap program 146.

Computer system 101 can present names 142, 147, etc. at user-interface 103. A user can select one of the present names to select the corresponding bootstrap program. For example, a user can enter selection 124, selecting name 142 along with path 143.

Method 200 includes receiving a selection of a network bootstrap program from among the one or more network bootstrap programs (207). For example, boot process 102 can receive selection 124, selecting name 142 along with path 143.

In response to receiving the selection of the network bootstrap program, using the corresponding path to transfer the network bootstrap program from the other computer system, over the Wide Area Network (WAN), to the computer system (208). For example, in response to receiving selection 124, boot process 102 can use path 143 to transfer bootstrap program 141 from computer system 111 to computer system 101 over network 151. In some embodiments, TFTP is used to transfer bootstrap program 141 over the Internet.

Method 200 includes running the network bootstrap program at the computer system to perform the maintenance operation at the computer system (209). For example, boot process 102 can run bootstrap program 141 at computer system 101 to perform maintenance operation 108. Maintenance operation 108 can be malware scanning, operating system repair, returning computer system 101 to factory defaults, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including one or more processors, system memory, and a display device, a method for booting from a trusted network image to perform a maintenance operation at the computer system, the method comprising:
   initiating a boot process from an internal firmware memory at the computer system, the boot process initiated without reference to any interfaces for exchanging data with any local storage devices accessible at the computer system;
   presenting a boot order menu at the display device in response to input received during the boot process, the boot order menu including one or more selectable local boot options and a network boot option, the network boot option for performing the maintenance operation on software previously installed at the computer system by executing a network bootstrap program stored at another computer system on a network, the previously installed software having been installed on a local storage device accessible to the computer system prior to the boot process being initiated;
   in response to receiving selection of the network boot option at the boot order menu, the firmware memory controlling other components of the computer system to obtain the network bootstrap program through network communication, including:
      connecting to the other computer system on the network using network communication;
      making a trust determination to establish trust with the other computer system; and
      after establishing trust with the other computer system, receiving a path to the network bootstrap program from the other computer system; and
   running the network bootstrap program at the computer system to perform the maintenance operation on the previously installed software at the computer system, the network bootstrap program run prior to transitioning the boot process to instructions outside of the firmware memory.

2. The method of claim 1, wherein presenting a boot order menu at the display device comprises presenting a boot order menu including a boot option to scan the previously installed software for malware by executing the network bootstrap program.

3. The method of claim 1, wherein connecting to the other computer system comprises using a Preboot Execution Environment (PXE) to connect to a boot image server.

4. The method of claim 1, wherein connecting to the other computer system on a network comprises using an Internet Protocol (IP) address to connect to a Preboot Execution Environment (PXE) boot server on the Internet.

5. The method of claim 1, wherein making a trust determination to establish trust with the other computer system comprises using a public/private key pair of the other computer system to determine that the other computer system is a trusted computer system.

6. The method of claim 1, wherein making a trust determination to establish trust with the other computer system comprises using a one-time pad (OTP) to validate that the computer system is connected to the other computer system.

7. The method of claim 6, wherein using a one-time pad (OTP) to validate that the computer system is connected to the other computer system comprises: receiving a first one-time pad from the other computer system via networks communication; receiving a second one-time pad via an out of band communication channel; and a Preboot Execution Environment (PXE) determining that the first one-time pad and the second one-time pad are the same one-time pad.

8. The method of claim 1, further comprising using the path to transfer the network bootstrap program into system memory;
wherein running the network bootstrap program comprises running the network bootstrap program from system memory; and
wherein the local storage device accessible to the computer system comprises a read/write storage device.

9. The method of claim 1, wherein running the network bootstrap program at the computer system to perform the maintenance operation comprises running the network bootstrap program to scan the previously installed software for malware.

10. The method of claim 9, further comprising: the selected network bootstrap program identifying malware; and the selected network bootstrap program removing the malware.

11. The method of claim 1, wherein running the selected network bootstrap program at the computer system to perform the maintenance operation comprises running the network bootstrap program to perform a factory reset of the computer system.

12. The method of claim 1, wherein running the selected network bootstrap program at the computer system to perform the maintenance operation comprises running the network bootstrap program to repair an operating system previously installed at the computer system.

13. A computer program product for use at a computer system, the computer system including a display device, the computer program product for implementing a method for booting from a trusted network image to perform a maintenance operation at the computer system, the computer program product comprising an internal firmware memory having stored thereon computer-executable instructions that, when executed at a processor, cause the computing device to perform the method, including the following:
initiate a boot process at the computer system, the boot process initiated without reference to any interfaces for exchanging data with any local storage devices accessible at the computer system;
present a boot order menu at the display device in response to input received during the boot process, the boot order menu including one or more selectable local boot options and a network boot option, the network boot option for performing the maintenance operation on software previously installed at the computer system by executing a network bootstrap program stored at another computer system on a network, the previously installed software having been installed on a local storage device accessible to the computer system prior to the boot process being initiated;
in response to receiving a selection of the network boot option at the boot order menu, control other components of the computer system to obtain the network bootstrap program through network communication, including:
connect to the other computer system on a network using network communication;
make a trust determination to establish trust with the other computer system; and
after establishing trust with the other computer system, receive a path to the network bootstrap program from the other computer system; and
run the network bootstrap program at the computer system to perform the maintenance operation on the previously installed software at the computer system, the network bootstrap program run prior to transitioning the boot process to instructions outside of the firmware memory.

14. The computer program product of claim 13, wherein computer-executable instructions that, when executed, cause the computing device to present a boot order menu at the display device comprise computer-executable instructions that, when executed cause the computing device to present a boot order menu including a boot option to scan the previously installed software for malware by executing the network bootstrap program.

15. The computer program product of claim 13, wherein computer-executable instructions that, when executed, cause the computing device to connect to the other computer system comprise computer-executable instructions that, when executed, cause the computing device to use a Preboot Execution Environment (PXE) to connect to a boot image server.

16. The computer program product of claim 13, wherein computer-executable instructions that, when executed, cause the computing device to connect to the other computer system comprise computer-executable instructions that, when executed, cause the computing device to use an Internet Protocol (IP) address to connect to a Preboot Execution Environment (PXE) boot server on the Internet.

17. The computer program product of claim 13, wherein computer-executable instructions that, when executed, cause the computing device make a trust determination to establish trust with the other computer system comprise computer-executable instructions that, when executed, cause the computing device to use a one-time pad (OTP) to validate that the computer system is connected to the other computer system.

18. The computer program product of claim 17, wherein computer-executable instructions that, when executed, cause the computing device to validate that the computer system is connected to the other computer system comprise computer-executable instructions that, when executed, cause the computing device to: receive a first one-time pad from the other computer system via networks communication; receive a second one-time pad via an out of band communication channel; and determine, at a Preboot Execution Environment (PXE), that the first one-time pad and the second one-time pad are the same one-time pad.

19. The computer program product of claim 13, wherein computer-executable instructions that, when executed, cause the computing device to run the selected network bootstrap program at the computer system to perform the maintenance operation one the previously installed software at the computer system comprise computer-executable instructions that, when executed, cause the computing device to run the network bootstrap program to perform a maintenance operation selected from among: scanning the previously installed software for malware system, performing a factory reset of the computer system, and repairing an operating system previously installed at the computer system.

20. At a computer system, the computer system including one or more processors, system memory, and a display device, the computer system connected to the Internet, a method for booting from a trusted network image to perform a maintenance operation at the computer system, the method comprising:
  initiating a boot process from an internal firmware memory at the computer system, the boot process initiated without reference to any interfaces for exchanging data with any local storage devices accessible at the computer system;
  presenting a boot order menu at the display device in response to input received during the boot process, the boot order menu including one or more selectable local boot options and a network boot option, the network boot option for performing the maintenance operation on software previously installed at the computer system by executing a network bootstrap program stored at another computer system on the Internet, the previously installed software having been installed on a local storage device accessible at the computer system prior to the boot process being initiated;
  in response to receiving a selection of the network boot option, the firmware memory controlling other components of the computer system to obtain the network bootstrap program through network communication, including:
    using a Preboot Execution Environment (PXE) to connect to the other computer system on the Internet using the Internet Protocol (IP) address for the other computer system;
    validating a one-time pad to determine that the other computer system is a trusted computer system; and
    after determining that the other computer system is a trusted computer system, receiving a path to the network bootstrap program from the other computer system; and
  running the network bootstrap program at the computer system prior to completing the boot process to perform the maintenance operation on the previously installed software at the computer system, the network bootstrap program run prior to transitioning the boot process to instructions outside of the firmware memory.

* * * * *